(12) United States Patent
Poethke et al.

(10) Patent No.: US 6,334,293 B1
(45) Date of Patent: Jan. 1, 2002

(54) STEEL CORD WITH POLYMER CORE

(75) Inventors: Horst Poethke, Kuurne; Steven Wostyn, Desselgem; Stijn Vanneste, Ingelmunster, all of (BE)

(73) Assignee: N.V. Bekaert S.A., Zwevegem (BE)

( * ) Notice: Subject to any disclaimer, the term of this patent is extended or adjusted under 35 U.S.C. 154(b) by 0 days.

(21) Appl. No.: 09/506,800

(22) Filed: Feb. 18, 2000

(30) Foreign Application Priority Data

Mar. 4, 1999 (EP) .............................................. 99200609

(51) Int. Cl.[7] ................................................ D02G 3/02
(52) U.S. Cl. .............................. 57/210; 57/212; 57/213; 57/215; 57/216; 57/219; 57/222; 57/230; 57/243
(58) Field of Search .......................... 57/210, 212, 213, 57/215, 216, 219, 222, 230, 243

(56) References Cited

U.S. PATENT DOCUMENTS

| | | | | |
|---|---|---|---|---|
| 4,430,383 A | * | 2/1984 | Smith et al. ................. | 428/364 |
| 4,458,475 A | * | 7/1984 | Schmit et al. ................. | 57/243 |
| 4,878,343 A | * | 11/1989 | Weidenhaupt et al. ......... | 57/222 |
| 4,969,497 A | * | 11/1990 | Bourgois ..................... | 152/451 |
| 6,007,912 A | * | 12/1999 | Doujak ........................ | 428/179 |

FOREIGN PATENT DOCUMENTS

| | | |
|---|---|---|
| BE | 900 175 | 11/1984 |
| DE | 1 027 539 | 4/1958 |
| DE | 195 35 597 | 3/1997 |
| EP | 0 627 520 | 12/1994 |
| EP | 0627520 B1 | * 12/1994 |

* cited by examiner

*Primary Examiner*—Danny Worrell
*Assistant Examiner*—Shaun R Hurley
(74) *Attorney, Agent, or Firm*—Foley & Lardner

(57) ABSTRACT

The invention relates to a composite cord (10) for reinforcement of elastomers comprising a core (12) of a high polymer material, a first layer of steel filaments (14) twisted around said core and a second layer of steel filaments (16) twisted around said first layer. The polymer material is present in a sufficient volume to create gaps between adjacent filaments of the first layer and possibly also between the filaments of the second layer. The composite cord is characterized by a decreased fretting of the steel filaments.

19 Claims, 1 Drawing Sheet

STEEL CORD WITH POLYMER CORE

FIELD OF THE INVENTION

The present invention relates to a composite cord for the reinforcement of elastomers such as rubber, for example used for tires, conveyor belts and hoses.

BACKGROUND OF THE INVENTION

Steel cords and more particular compact cords are widely known. They are used for the reinforcement of rubber articles. In a compact steel cord the composing steel filaments have the same twisting direction and the same twisting step. The filaments of a compact steel cord have line contact with adjacent steel filaments. Both steel cords and compact cords have the drawback that the surface of the core filament can be damaged by fretting. This damage can be considerably high. The fretting is not limited to the core filaments, also the filaments arranged around the core filament suffer from fretting.

In the conventional cord a single filament is wrapped around said cord. This type of cord features the disadvantage that the wrapping filament causes fretting on the filaments of the outer layer. EP 0 627 520 provides a wrapless compact steel cord, whereby the outer filaments fulfil the function of the wrapping filament. However, these outer filaments exercise a great pressure on the core filament. This results in fretting on the core filament and thus in a considerable damage of this core filament.

Another known disadvantage of steel cords with a core and filament layers, and more particularly of compact cords, is that they suffer from core migration. Core migration is the slipping out of the filaments of the cord due to repeated bends.

SUMMARY OF THE INVENTION

It is an object of the present invention to provide a composite cord which avoids the drawbacks of the prior art.

It is also an object to reduce the fretting of the core filament and to reduce the fretting of the filaments arranged around the core filament. It is a further object to provide a composite cord with an improved stability of the cord structure. With an improved stability of the cord structure is meant a better and more stable distribution of the filaments over the cord. It is also an object to avoid core migration. It is still another object of the invention to provide a composite cord with an increased life time.

According to one aspect of the invention, there is provided a composite cord for reinforcement of elastomers comprising a core of a high polymer material. A first layer of steel filaments is twisted around said core and a second layer of steel filaments is twisted around said first layer. Preferably, all filaments of the first and the second layer have the same twisting step. More preferably, all filaments of the first and second layer have not only the same twisting step but also the same twisting direction.

Since the core filament consists of a polymer material, there is no fretting on the core filament. Core migration which is a considerable drawback of the prior art steel cords is by that also avoided.

In a preferred embodiment, the polymer material is present in a sufficient volume to create gaps between the filaments of the first layer. In such an embodiment there is no direct contact between the steel filaments of the first layer. This results in a considerable reduction of the degree of fretting between the filaments of the first layer.

Preferably, the gaps between adjacent filaments of the first layer have an average size of 0.002 mm. More preferably the average size of the gaps is at least 0.004 mm. By average size of the gaps is meant the average size of all gaps between adjacent filaments of the first layer over the entire length of the cord. Occasionally, some cross-sections may have gaps that are less than the average size.

The size of the gaps can be expressed in terms of the theoretical diameter of the central core d, the diameter of the filament of the first layer D and the number of filaments in the first layer n, according to the following equation:

$$a(d+D)\sin\frac{180°}{n} - D$$

By theoretical diameter of the central core of the cord is meant the diameter of the best fitting circle in the hole created by the steel filaments of the cord.

In another embodiment, the volume of the polymer core is chosen in order to create gaps not only between adjacent filaments of the first layer but also between adjacent filaments of the second layer.

The presence of gaps between the steel filaments is important since it allows the penetration of the elastomer compound to the steel filaments up to the core of the cord. In this way the filaments can be completely embedded in the polymer material, i.e. the high polymer material of the core and the elastomer.

Different types of organic filaments can be used as core material. To avoid the melting of the polymer material during a preheating or during vulcanisation, the melting point of the used polymer must be sufficiently high. Preferably, the melting temperature of the polymer material is higher than 135° C., for example higher than 140° C. Preferably, the melting point is lower than the vulcanisation temperature. Such polymers only melt partially during the preheating; a completely flowing out is nevertheless avoided.

The polymer core comprises at least one filament of a high polymer. The filaments may be fused or twisted. Suitable filaments are polyamid filaments, polyester filaments, polyethylene filaments, polypropylene filaments, aramid filaments such as Twaron® or Kevlar®, filaments made of a copolyester thermoplastic elastomer, such as Arnitel®, or any strong filaments. Suitable polyamid filaments are for example nylon 6 or nylon 6.6. Also polyethylene naphtalate (PEN) or polyethylene terephtalate (PET) filaments can be considered.

Polyester has the advantage that it is characterised by a low adsorption of humidity. It has been shown that a core comprising one or more high performance polyethylene fibers is very suitable. These fibers have a tensile strength of more than 2 GPa, for instance 3 GPa. These super strong polyethylene fibers preferably have a macromolecular orientation of more than 85%, more preferably the macromolecular orientation is greater than 90%. The level of crystallinity of the polyethylene is preferably more than 80%, for instance 85%. These fibers are known as Dyneema®.

Alternatively, filaments made of two different materials can be used as polymer core. These filaments comprise a core material coated with a polymer material. The core material gives the cord the required strength. The polymer material surrounding the core material preferably flows out during the heat treatment.

The core material can for example be PEN or PET. The material surrounding the core material is for example polyethylene, polypropylene or a copolyester thermoplastic elastomer, known as Arnitel®. Also a modified PET characterised by a lower melting point than the conventional PET can be used as covering material of the core. These materials may be applied to the core material by extrusion.

For all the above mentioned polymer core material, the diameter of the polymer core is chosen so that the above mentioned minimum size of the gaps between adjacent filaments of the first layer is obtained.

The polymer filaments may be dipped in order to reach a good adhesion between the elastomer compound and the polymer.

Depending on the type of polymer that is used and depending on the diameter of the polymer core, different embodiments can be realised.

In a first embodiment a polymer with a melting temperature higher than the vulcanisation temperature is used as core. A polymer with such a high melting point is for example polyester. Because of the high melting temperature of the polymer, the polymer material does not flow out during the heating. Preferably, the diameter of the polymer core is chosen so that the filaments arranged around the core in a first layer do not touch each other.

In a second embodiment a polymer with a melting point higher than 140° C. but lower than the vulcanisation temperature is used. During vulcanisation the polymer material flows out. The amount of polymer is chosen so that the material fills the central hole created by the filaments of the cord completely and the gaps between adjacent filaments of the first layer at least partially. The filaments of the first layer are thus at least partially embedded in a viscous or viscoelastic matrix. In this way the polymer material forms a kind of a cushion. An average gap size between adjacent filaments of the first layer of at least 0.002 mm is obtained, this means that the filaments have no direct contact with each other. Occasionally, the gap size can be less than the desired average gap size and in some exceptional cases there can be a cross-section where some filaments have contact with each other. But even in the latter situation, the average gap size is at least 0.002 mm. Because the partial embedment of the filaments in the polymer matrix and because there is no direct contact between adjacent filaments, there is a considerable improvement of the fretting characteristics of the filaments of the first layer. A composite cord according to the above described embodiment further features the advantage that the stability of the cord type is improved.

In a further embodiment, after vulcanisation the polymer material does not only fill the central hole of the cord and the gaps between adjacent filaments of the first layer completely, but the amount of polymer is chosen so that after flowing out of the polymer material, the polymer material has contact with the second layer of filaments. At least half of the number of the filaments of the second layer, i.e. the filaments which are situated between two filaments of the first layer, has contact with the polymer material. This further reduces the fretting of the filaments, not only of the filaments of the first layer, but also of the filaments of the second layer.

Possible constructions of cord types are C+6+12, C+8+12, C+8+13, C+9+15. In this notation C is the high polymer core. For compact cords, the number of filaments in the first layer is preferably 5, 6 or 7. The number of filaments in the second layer is preferably the double of the number of filaments in the first layer. Preferable constructions for compact cords are constructions of the type C+15, C+18 and C+21.

As mentioned above, preferably, all of the filaments are embedded in polymer material, either by flowing out of the high polymer material and/or by the penetration of the elastomer towards the center of the cord. The penetration of the elastomer can further be increased by replacing some of the filaments of the second layer by filaments having a somewhat lower diameter.

The composite cords are preferably wrapless cords. The filaments of the second layer exercise a force which is directed radially inward. In this way the filaments of the outer layer fulfil the function of the wrapping filament of a conventional steel cord. This radially inward directed force of the outer layer filaments can be realised in different ways. A first way to realise this is to provide the outer layer filaments with residual torsions which tend to close the steel cord. A second way to exert a force which is directed radially inward is to preform the outer layer filaments in such a way that the preforming ratio is smaller than or equal to one hundred percent. The preforming ratio of a particular filament is defined as the ratio of the diameter of the helicoid of the disentangled filament to the diameter of the helicoid of the filament in the cord. A third way to exert a force which is directed radially inward is to put the outer layer filaments in the steel cord under a tensile force. The outer layer filaments are put under a tensile force in the steel cord, if after careful disentangling of the outer filaments, the twist pitch of the disentangled outer filaments is smaller than the twist pitch of the steel cord. Also combinations of the three above described ways are possible in order to realise a radially inward directed force of the outer filaments. The way of manufacturing such a wrapless steel cord is disclosed in EP 0 627 520. Such kind of steel cord, however, suffers from fretting of the core filaments since there is a great pressure on this core filaments by the outer filaments.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
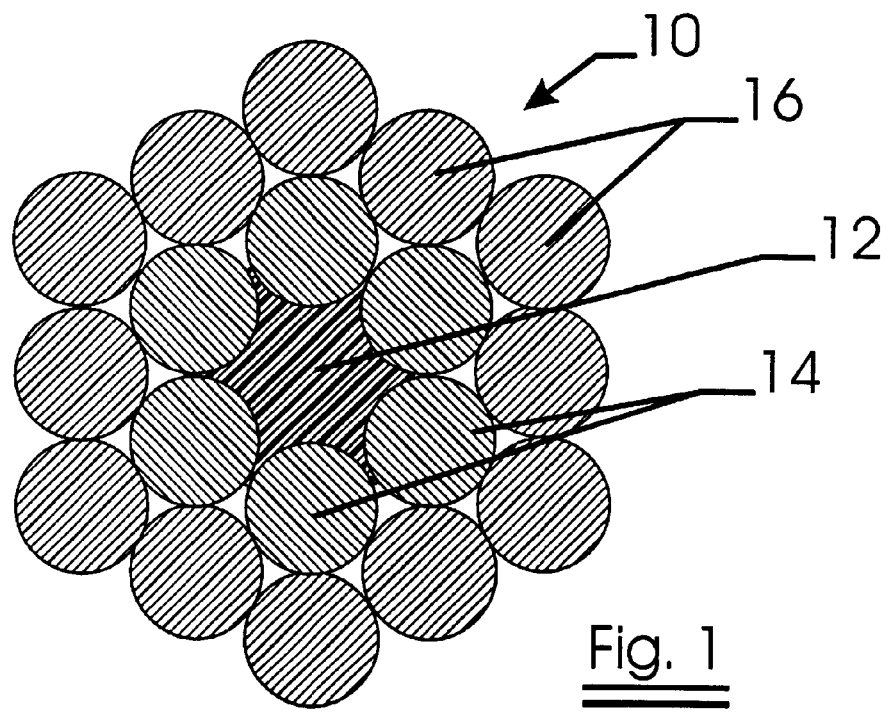
FIG. 1 and FIG. 2 show cross-sections of composite cord constructions according to the present invention.

Referring to FIG. 1, a composite cord 10 according to the present invention comprises a high polymer core 12 and eighteen steel filaments 14, 16 arranged around this core. The high polymer core comprises polyethylene filaments. Six of the steel filaments 14 are twisted around the core in a first layer, the other twelve steel filaments 16 are twisted around the first layer of filaments. The theoretical diameter of the central core of the cord is 0.20 mm. The diameter of the steel filaments equals 0.175 mm. All the steel filaments have a lay length of 10.0 mm. Between adjacent filaments of the first layer, there are gaps with an average size of 0.0125 mm. During vulcanisation the core material flows out and fills at least partially the gaps between the filaments of the first layer. In this embodiment the filaments of the first layer are partially embedded in the polymer material of the core. The diameter of the high polymer core must be at least 0.235 mm in order to obtain this partially embedment of the filaments of the first layer. This required minimum diameter can be calculated by applying the following equation:

$$d_c = \sqrt{d^2 + \frac{n \cdot \Delta A}{0.785}}$$

with $d_c$: the diameter of the polymer core
d: the theoretical diameter of the core of the cord
n: the number of filaments in the first outer layer $$\Delta A: \frac{1}{8}\left[(d+D)^2 \cdot \sin\alpha - 2\pi \cdot \frac{d^2}{n} - D^2\pi\left(1 - \frac{2}{n}\right)\right]$$

D: the diameter of the filaments of the first outer layer $$\alpha: \frac{360°}{n}$$

Figure 2:
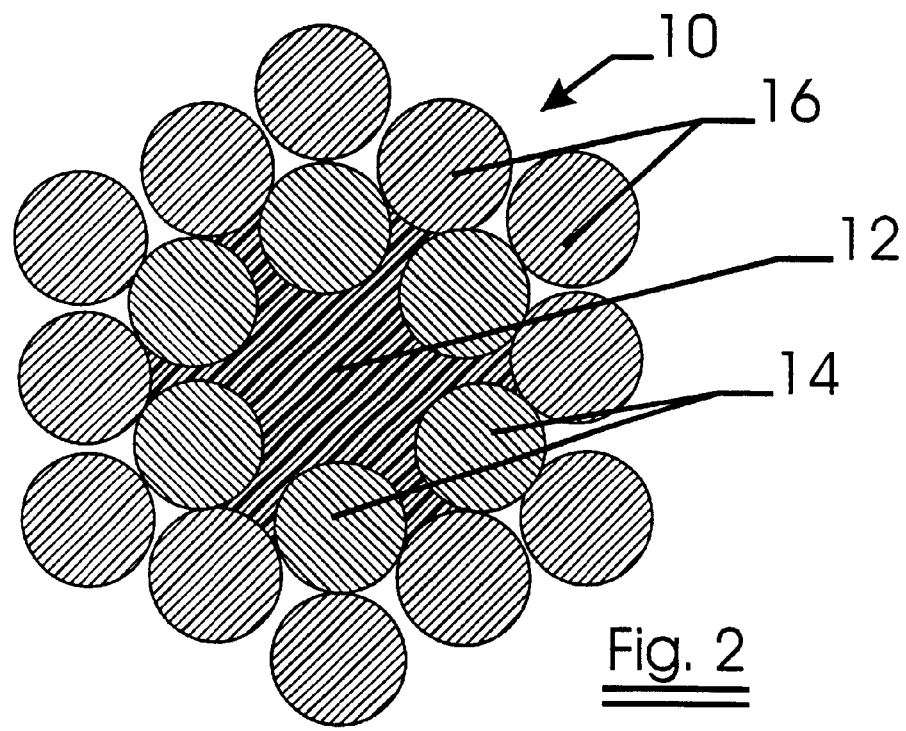

FIG. 2 shows the cross-section of another embodiment of a composite cord 10. The high polymer core 12 comprises super strong polyethylene filaments. The macromolecular orientation of the polymer is 90% and the level of crystallinity is 85%. Eighteen steel filaments are twisted around the core. Six of these filaments 14 are arranged in a first layer around the core, the other twelve filaments 16 are twisted in a second layer around the first layer. The theoretical diameter of the core of the cord is 0.20 mm. The diameter of the steel filaments equals 0.175 mm. All filaments have a lay length of 10.0 mm. The average gap between adjacent filaments of the first layer is 0.0125 mm. There are also gaps between adjacent filaments of the second layer. The average size of these gaps equals 0.003 mm. During vulcanisation the core material flows out till it has contact with the filaments of the second layer. The polymer material fills the central hole of the filaments of the cord and the gaps between the filaments of the first layer completely and has contact with half of the filaments of the second layer. In this embodiment the filaments of the first layer are almost completely embedded in the polymer material. The required diameter of the high polymer core to obtain such an embodiment for this type of cord is at least 0.263 mm.

The penetration of the elastomer towards the center of the cord can be improved by replacing the twelve filaments 16 of the second layer having a diameter of 0.175 mm by six filaments having a diameter of 0.175 mm and six filaments having a diameter of 0.16 mm. Filaments with a diameter of 0.175 and filaments with a diameter of 0.16 mm are thereby alternated.

Two types of composite cord according to the present invention have been subjected to a conventional endless belt test. The first type of composite cord comprises a high polymer core of super strong polyethylene fibers and 18 steel filaments with a diameter of 0.175 mm twisted around the core. The theoretical diameter of the central core of the filaments of the cord is 0.21 mm. The second type comprises polyester filaments as high polymer core and 18 steel filaments twisted around the core. The theoretical diameter of the central core is 0.22 mm and the diameter of the steel filaments equals 0.175 mm. These two composite cords are compared with a conventional compact cord of the type 0.20+18×0.175.

The breaking load of the filaments of the different types of cords is measured before and after the carrying out of an endless belt test. The results of the test are summarised in table 1. Column 3 shows the loss in breaking load of the filaments after carrying out the endless belt test, expressed as percentage.

The filaments of the different tested cord types are also subjected to a bending fatigue test before and after the endless belt test. The number of cycles before fracture is measured. This bending fatigue test is carried out with an axial load of 980 g. Column 4 of table 1 shows the percentage reduction in the number of cycles after the carrying out of an endless belt test.

TABLE 1

| Cord type | Filament | Loss of breaking load (%) | Reduction in the number of cycles (%) |
|---|---|---|---|
| Compact cord 0.20 + 18 × 0.175 | C O | 12.3% 11.7% | 51.7% 31% |
| Composite cord Type 1: 0.21 + 18 × 0.175 | O | 0.8% | 13% |
| Composite cord Type 2: 0.22 + 18 × 0.175 | O | 5.0% | 17% |

C = core filament
O = steel filament

From this, it appears that the filaments of a composite cord according to the invention have a higher breaking load than the filaments of a conventional compact cord after the carrying out of an endless belt test.

The number of cycles of the bending fatigue test that can be performed after the endless belt test is considerably higher for the composite cords in comparison with a conventional compact cord.

Table 2 shows the main characteristics of the two types of the above described composite cords compared with a conventional compact cord.

TABLE 2

| | Construction type | | |
|---|---|---|---|
| Property | Compact cord | Composite cord (type 1) | Composite cord (type 2) |
| Linear density (g/m) | 3.77 | 3.53 | 3.57 |
| Breaking load (N) | 1340 | 1303 | 1251 |
| Tensile strength (N/mm²) | 2794 | 2903 | 2890 |
| Total elongation ($A_t$ %) | 2.75 | 2.90 | 2.99 |
| Core migration (4 point bending test) | Yes | no | no |

It is clear from the results of table 2 that the mechanical characteristics of the composite cord according to the invention are very similar with the characteristics of a conventional compact cord.

A steel cord and more particular a composite cord has to possess several features in order to be adapted for the reinforcement of elastomers. The steel filaments of the cord have a diameter ranging from 0.05 mm to 0.80 mm, preferably the diameter of the filaments lies in the range of 0.05 to 0.45 mm. A typical steel composition for the filaments is a composition having a carbon content ranging from 0.70% to 1.20%, a manganese content ranging from 0.10% to 1.10%, a silicon content ranging from 0.10% to 0.90% and a maximum sulfur and phosphorus content of 0.15%. Preferably, the sulfur and phosphorus content is limited to 0.010%. Elements such as chromium, copper and vanadium can be added, chromium up to 0.20 till 0.40%, copper up to 0.20% and vanadium up to 0.30%. All concentrations are expressed in weight percentages. The steel filaments are usually provided with a coating which promotes the adherence of steel wire to the elastomer compound. A copper alloy coating such as brass (either with a low or a high copper content) or a complex coating such as a Ni/brass, a brass/Co, a Zn/Co or a Zn/Mn alloy can be used. A bifunctional organic coating such as a coating comprising silane compounds is also suitable. The thickness of the coating ranges preferably from 0.15 to 0.35 μm. Depending upon its composition, its diameter and upon the degree of drawing the tensile strength of the filaments may range from 2000 MPa until 4000 MPa or even more.

What is claimed is:

1. A composite cord (10) for reinforcement of elastomers comprising a core (12) of a high polymer material, wherein the high polymer material is a macromolecular substance having molecules that are large multiples of units of low molecular weight, a first layer of steel filaments (14) being twisted around said core and a second layer of steel filaments (16) being twisted around said first layer, said filaments of the first layer and second layer all having the same twisting direction and the same twisting step.

2. A composite cord according to claim 1, whereby said polymer material is present in a sufficient volume to create gaps between adjacent filaments of the first layer.

3. A composite cord according to claim 2, whereby said gaps have an average size of at least 0.002 mm.

4. A composite cord according to any one of claims 1 to 3, whereby said polymer is present in a sufficient volume to fill after a heat treatment or after vulcanisation the central hole created by the filaments of the cord and at least partially the gaps between adjacent filaments of the first layer.

5. A composite cord according to any one of claims 1 to 3, whereby said polymer is present in a sufficient volume to fill after a heat treatment or after vulcanisation the central hole created by the filaments of the cord and the gaps between adjacent filaments of the first layer and whereby the polymer material has contact with the filaments of the second layer which are situated between two filaments of the first layer.

6. A composite cord according to claim 1, whereby the polymer of said core has a melting point greater than 135° C. and lower than the vulcanisation temperature of the elastomer.

7. A composite cord according to any one of claims 1 to 5, whereby said polymer core comprises at least one polyamid filament.

8. A composite cord according to claim 7, whereby said polyamid is nylon 6 or nylon 6.6.

9. A composite cord according to any one of claims 1 to 5, whereby said polymer core comprises at least one polyester filament or at least one copolyester thermoplastic elastomer filament.

10. A composite cord according to claim 1, whereby said polymer core comprises at least one polyethylene or polypropylene filament.

11. A composite cord according to any one of claims 1 to 5, whereby said polymer core comprises at least one super strong polyethylene filament with a tensile strength of more than 2 GPa.

12. A composite cord according to claim 11, whereby said polyethylene has a macromolecular orientation greater than 85%.

13. A composite cord according to claim 11, whereby said polyethylene has a level of crystallinity greater than 80%.

14. A composite cord according to any one of claims 1 to 5, whereby said polymer core comprises a core material and a polymer material surrounding this core material.

15. A composite cord according to claim 14, whereby said core material is selected from the group consisting of polyethylene naphtalate and polyethylene terephtalate and said polymer material surrounding this core material is selected from the group consisting of polyethylene, polypropylene and copolyester thermoplastic elastomer.

16. A composite cord according to any one of claims 1 to 15, whereby the number of filaments in the first layer ranges from 5 to 7.

17. A composite cord according to any one of claims 1 to 16, whereby the number of filaments in the second layer is the double of the number of filaments in the first layer.

18. A composite cord according to any one of claims 1 to 17, whereby said cord is a wrapless cord.

19. A composite cord according to any one of claims 1 to 18, whereby the filaments in the second layer exercise a force which is directed radially inward.

* * * * *